United States Patent
Kida et al.

(10) Patent No.: US 9,117,148 B2
(45) Date of Patent: Aug. 25, 2015

(54) COMPUTER-READABLE NON-TRANSITORY STORAGE MEDIUM WITH COMMUNICATION PROGRAM STORED THEREON, INFORMATION PROCESSING APPARATUS, IMAGE FORMING SYSTEM, AND IMAGE FORMING APPARATUS

(71) Applicant: KYOCERA Document Solutions Inc., Osaka (JP)

(72) Inventors: Yasuhiko Kida, Osaka (JP); Yumi Kitamura, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 13/737,877

(22) Filed: Jan. 9, 2013

(65) Prior Publication Data

US 2013/0182271 A1  Jul. 18, 2013

(30) Foreign Application Priority Data

Jan. 13, 2012  (JP) ................. 2012-005529

(51) Int. Cl.
*G06F 3/12* (2006.01)
*G06K 15/02* (2006.01)
*G03G 21/02* (2006.01)

(52) U.S. Cl.
CPC .............. *G06K 15/02* (2013.01); *G06F 3/1204* (2013.01); *G06F 3/1267* (2013.01); *G06F 3/1285* (2013.01); *G03G 21/02* (2013.01)

(58) Field of Classification Search
CPC ... G06F 3/1204; G06F 3/1285; G06F 3/1288; G06F 3/1206; G06F 3/122; H04N 2201/0015; H04N 2201/0084; H04N 2201/33378; H04N 1/00233; H04N 1/00477; H04N 1/00973; H04N 2201/0082; H04N 2201/0094; H04N 2201/3204; G06K 15/181; G06K 15/02; G06K 15/021; G06K 15/1807; G06K 15/1836; G06K 15/1848

USPC ................. 358/1.13, 1.14, 1.15, 1.1
See application file for complete search history.

(56) References Cited

U.S. PATENT DOCUMENTS

| | | | |
|---|---|---|---|
| 7,034,954 B1 | 4/2006 | Utsunomiya | |
| 2004/0080779 A1* | 4/2004 | Kawamoto | 358/1.14 |
| 2008/0209419 A1* | 8/2008 | Maeda | 718/100 |
| 2011/0149323 A1* | 6/2011 | Kawaura | 358/1.13 |

FOREIGN PATENT DOCUMENTS

| | | | |
|---|---|---|---|
| JP | 06-290006 A | 10/1994 | |
| JP | 2001-080143 A | 3/2001 | |

(Continued)

OTHER PUBLICATIONS

Notice of Rejection mailed by Japan Patent Office on Jul. 9, 2013 in the corresponding Japanese patent application No. 2011-282203.

*Primary Examiner* — Martin Mushambo
(74) *Attorney, Agent, or Firm* — Knobbe, Martens, Olson & Bear, LLP

(57) ABSTRACT

An information processing apparatus includes a detection unit, a data acquisition unit, and a communication unit. The detection unit is configured to detect whether or not print target data based on a print job has been created in a format suitable for printing on a predetermined image forming apparatus. The data acquisition unit is configured to acquire, when the detection unit detects that the print target data has been created, the created print target data and accompanying print information extracted from the print job. The communication unit is configured to transmit print data containing the acquired print target data and accompanying print information to the image forming apparatus using a predetermined protocol applicable to the image forming apparatus.

6 Claims, 13 Drawing Sheets

(56) References Cited

FOREIGN PATENT DOCUMENTS

| JP | 2003-271347 A | 9/2003 |
| JP | 2005-085105 A | 3/2005 |
| JP | 2008-097239 A | 4/2008 |
| JP | 2008-97239 A | 4/2008 |

* cited by examiner

FIG. 10

| ID INFORMATION | 711826 |
| --- | --- |
| DOCUMENT NAME | map.pdf |
| DETAILS | 2 PAGES, 2 COPIES, COLOR |
| ACCEPTANCE DATE | 2010/10/05 13:35 |
| FEE | 200 YEN |

PLEASE PUSH PRINT BUTTON OR DELETE BUTTON.

PRINT

DELETE

D3 d31

ND IMAGE FORMING APPARATUS

COMPUTER-READABLE NON-TRANSITORY STORAGE MEDIUM WITH COMMUNICATION PROGRAM STORED THEREON, INFORMATION PROCESSING APPARATUS, IMAGE FORMING SYSTEM, AND IMAGE FORMING APPARATUS

INCORPORATION BY REFERENCE

This application claims priority to Japanese Patent Application No. 2012-5529 filed on Jan. 13, 2012, the entire contents of which are incorporated by reference herein.

BACKGROUND

The present disclosure relates to a computer-readable non-transitory storage medium with a communication program stored thereon, an information processing apparatus, an image forming system, and an image forming apparatus and particularly relates to a technique for printing on the image forming apparatus print target data received from the information processing apparatus.

In public facilities in which an information processing apparatus and an image forming apparatus are installed to allow multiple users to share them, management relating to user's printing of print target data on the image forming apparatus is conducted, for example, in the following manners: (1) A manager accesses the information processing apparatus to select the image forming apparatus to be used for printing via the information processing apparatus. (2) If user's printing is permitted provided that a printing fee is charged to the user, a manager of the public facility collects the printing fee directly from the user. (3) There is also a management system that manages user's printing by printing print target data on the image forming apparatus via a print service server located on the Internet.

SUMMARY

One aspect of the present disclosure is an information processing apparatus including a detection unit, a data acquisition unit, and a communication unit.

The detection unit is configured to detect whether or not print target data based on a print job entered by a user has been created in a format suitable for printing on a predetermined image forming apparatus.

The data acquisition unit is configured to acquire, when the detection unit detects that the print target data has been created, the created print target data and accompanying print information extracted from the print job.

The communication unit is configured to transmit print data containing the print target data and the accompanying print information both acquired by the data acquisition unit to the image forming apparatus using a predetermined protocol applicable to the image forming apparatus.

Furthermore, another aspect of the present disclosure is a computer-readable non-transitory storage medium with a communication program stored thereon, wherein the communication program makes the information processing apparatus serve as a detection unit, a data acquisition unit, and a communication unit.

The detection unit is configured to detect whether or not print target data based on a print job entered by a user has been created in a format suitable for printing on a predetermined image forming apparatus.

The data acquisition unit is configured to acquire, when the detection unit detects that the print target data has been created, the created print target data and accompanying print information extracted from the print job.

The communication unit is configured to transmit print data containing the print target data and the accompanying print information both acquired by the data acquisition unit to the image forming apparatus using a predetermined protocol applicable to the image forming apparatus.

Moreover, another aspect of the present disclosure is an image forming apparatus including a print data receiving unit, an identification information creation unit, an identification information transmitting unit, a print data storage unit, a printing unit, an identification information acceptance unit, and a controller.

The print data receiving unit is configured to receive, when print data containing print target data in a predetermined format and accompanying print information extracted from a print job is created to comply with a predetermined protocol compatible with the image forming apparatus by an information processing apparatus, the print data complying with the protocol from the information processing apparatus.

The identification information creation unit is configured to create, when the print data receiving unit receives the print data, identification information for specifying the print data.

The identification information transmitting unit is configured to transmit the identification information created by the identification information creation unit to the information processing apparatus having transmitted the print data.

The print data storage unit is configured to store the print data received by the print data receiving unit in correlation with the created identification information.

The printing unit is configured to print the print target data contained in the print data.

The identification information acceptance unit is configured to accept an entry of the identification information.

The controller is configured to read from the print data storage unit the print data correlated with the identification information the entry of which has been accepted by the identification information acceptance unit and cause the printing unit to print the print target data contained in the print data using part of the accompanying print information.

BRIEF DESCRIPTION OF THE DRAWINGS

FIG. 10 is a diagram showing still another example of a screen displayed on the display unit.

DETAILED DESCRIPTION

Figure 1:
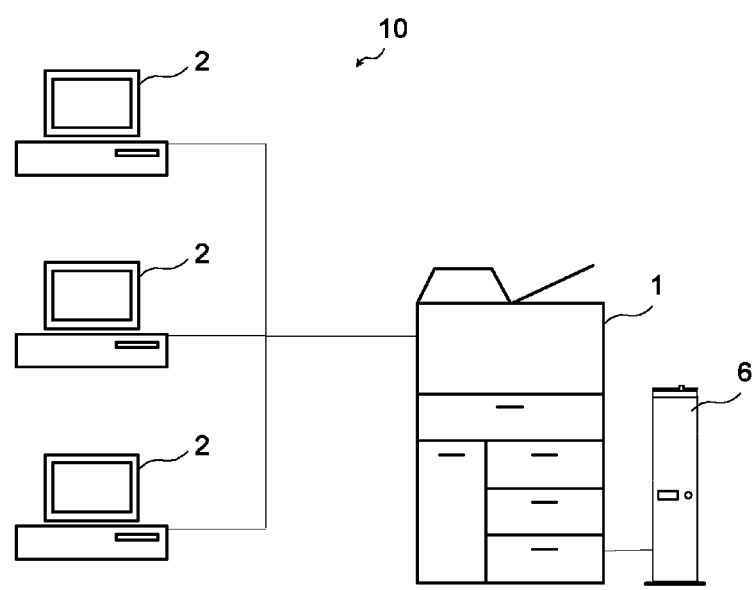
FIG. 1 is a diagram showing a general structure of an image forming system according to an embodiment corresponding to one aspect of the present disclosure.

With reference to the drawings, a description will hereinafter be given of a communication program, a computer-readable non-transitory storage medium with a communication program stored thereon, an information processing apparatus, an image forming system, and an image forming apparatus according to an embodiment corresponding to one aspect of the present disclosure. FIG. 1 is a diagram showing a general structure of the image forming system according to the embodiment corresponding to one aspect of the present disclosure.

An image forming system 10 according to the embodiment corresponding to one aspect of the present disclosure is configured to have a control unit in an information processing apparatus 2 and an image forming apparatus 1.

The information processing apparatus 2 is a personal computer or the like. The information processing apparatus 2 transfers data to and from the image forming apparatus 1 via a communication function using a local area network (LAN) or the like. For example, the information processing apparatus 2 is installed in a public facility for internet use or like facilities to allow multiple users to share it. Although no particular limitation is placed on the number of information processing apparatuses 2 to be included in the system 10, this embodiment shows an example in which the system 10 includes a plurality of information processing apparatuses 2.

The image forming apparatus 1 is an apparatus having at least a printer function and may be a so-called multifunction apparatus having multiple functions, including a printer, a copier, and a fax machine. In this embodiment, the image forming apparatus 1 is described as a multifunction apparatus. The image forming apparatus 1 has a communication function using a LAN or the like and transfers data via the communication function to and from the information processing apparatuses 2.

For example, the image forming apparatus 1 is installed, together with the information processing apparatuses 2, in a public facility for internet use or like facilities to allow multiple users to share it. The connection between the image forming apparatus 1 and each information processing apparatus 2 is established, for example, by a LAN, in which case the LAN may be wired or wireless.

The image forming apparatus 1 receives print target data stored on the information processing apparatus 2 from each information processing apparatus 2 via the LAN communication, and prints out (forms an image of) the print target data.

Furthermore, the image forming apparatus 1 is connected to a coin vendor 6. The coin vendor 6 is a device configured to collect a coin or a note as a printing fee for the print target data from the user and detect the completion of the collection (payment). The coin vendor 6 has a communication function for transferring data to and from a controller 101 (see FIG. 2) of the image forming apparatus 1 to notify the image forming apparatus 1 of information about whether or not the printing fee has been collected from the user. In addition, the coin vendor 6 functions as a component of the image forming apparatus 1 to the extent necessary in an embodiment to be described later.

Figure 2:
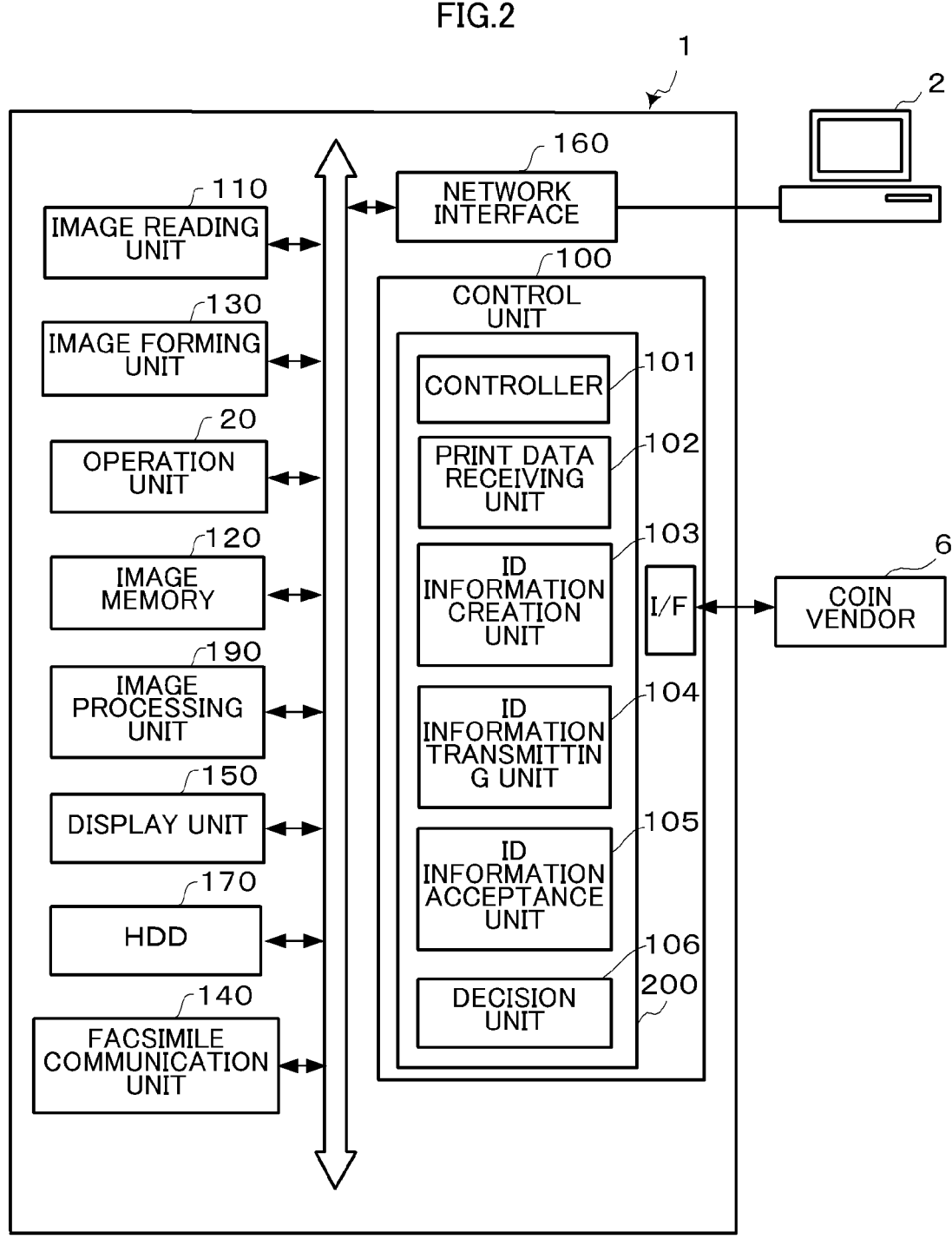
FIG. 2 is a block diagram schematically showing an internal structure of an image forming apparatus.

Next, the structure of the image forming apparatus 1 is described. FIG. 2 is a block diagram schematically showing an internal structure of the image forming apparatus 1.

The image forming apparatus 1 includes a control unit 100, an image reading unit 110, an image memory 120, and an image forming unit 130.

The image reading unit 110 is formed of a scanner or the like for reading a document image.

The image memory 120 provides a region for temporarily storing data or the like of the document read by the image reading unit 100 and temporarily storing data to be printed by the image forming unit 130.

The image forming unit (printing unit) 130 includes an electric charging device, an exposure device, a developing device, a transfer device, and a fixing device based on electrophotography. The image forming unit 130 forms an image of print target data sent from the information processing apparatus 2 and received by a print data receiving unit 102, an image of data read from a document by the image reading unit 110 or images of other data.

The image forming apparatus 1 further includes a facsimile communication unit 140 configured to perform various functions necessary for a facsimile communication and receive image data from an external facsimile device via a public line, an operation unit 20 formed of an image forming key or a transmission start key, numeric keys, abbreviated number keys, and so on and configured to accept user's entries including various command entries (e.g., an identification number to be described later, a print execution command for executing printing of print data (print target data) temporarily stored on an HDD 170 to be described below, etc.), and a display unit 150 formed of a liquid crystal display (LCD) or the like and configured to display operation guidance and the like for the user. The display 150 may also have a touch panel function to accept various user's commands.

The image forming apparatus 1 further includes an HDD (hard disk) 170 having a large storage area for storing document image data read by the image reading unit 110 and other data. In this embodiment, the HDD 170 serves as a print data storage unit that can temporarily store print data sent from the information processing apparatus 2 and received by the print data receiving unit 102 and hold the print target data until the user issues a print execution command.

The control unit 100 is formed of a CPU or the like. The control unit 100 includes a controller 101, a print data receiving unit 102, an identification information creation unit 103, an identification information transmitting unit 104, an identification information acceptance unit 105, and a decision unit 106. An image forming program is stored on the HDD 170 or an unshown memory, such as a ROM, serving as a storage medium. The control unit 100 operates as a computer in accordance with the image forming program and thus serves as the controller 101, the print data receiving unit 102, the identification information creation unit 103, the identification information transmitting unit 104, the identification information acceptance unit 105, and the decision unit 106 which constitute the image forming application 200.

The image forming program is distributed in recorded form on a storage medium, such as a USB memory, a CD or a DVD, read by a driver of the image forming apparatus 1, and then stored on the HDD 170, the unshown memory or the like. Alternatively, the image forming program is downloaded by the image forming apparatus 1 from a server connected to the image forming apparatus 1 on the network and thus stored on the HDD 107, the unshown memory or the like.

However, each of the controller 101, the print data receiving unit 102, the identification information creation unit 103, the identification information transmitting unit 104, the identification information acceptance unit 105, and the decision unit 106 of the control unit 100 may be constituted not by an operation based on the image forming program but by a hardware circuit.

The print data receiving unit 102 receives print data from the information processing apparatus 2 via a LAN and a network interface 160. This print data contains print target data, accompanying print information and so on. The print target data refers to data representing the entity of an image to be printed. The print target data is created, in a printer language employed by the image forming apparatus 1, by a printer driver unit 31 (see FIG. 3) of a control unit included in the information processing apparatus 2. The accompanying print information contains a document name, whether to print in color or black-and-white, a page size, the number of pages, and the number of copies and refers to information necessary to specify the manner of printing the print target data. The accompanying print information also contains device information indicating the information processing apparatus 2 having transmitted the print data. The print data containing the print target data and its accompanying print information is created to comply with a predetermined protocol (HTTPS in this embodiment) being employed on the image forming apparatus 1 by the control unit included in the information processing apparatus 2 and is then sent to the image forming apparatus 1. The print data receiving unit 102 receives only the print data created in compliance with the predetermined protocol.

The identification information creation unit 103 creates, when the print data receiving unit 102 receives print data from the information processing apparatus 2, identification (ID) information used for specifying the print data. This ID information is information attached to each print data set in order to identify the print data set specified by the user among a plurality of print data sets stored on the HDD 170 serving as a print data storage unit. The identification information creation unit 103 randomly creates, upon reception of the print data set, different ID information for each print data set. The controller 101 correlates the received print data with the ID information created for this print data and causes the HDD 170 to store the correlated print data.

The identification information transmitting unit 104 transmits (sends back) the ID information created for the print data by the identification information creation unit 103 to the information processing apparatus 2 having transmitted this print data.

The identification information acceptance unit 105 accepts an entry of the ID information from the user. The display unit 150 displays, under the control of the controller 101, a message prompting the user to enter the ID information. When the user enters the ID information by operating the operation unit 20, the ID information is accepted by the identification information acceptance unit 105.

The controller 101 governs the operation control of the units included in the image forming apparatus 1. Furthermore, the controller 101 reads from the HDD 170 the print data correlated with the ID information the entry of which has been accepted by the identification information acceptance unit 105, and causes the image forming unit 130 to print out (form an image of) the print target data contained in the print data. The controller 101 is connected to the coin vendor 6 via an interface.

The decision unit 106 decides whether or not the user should be charged a printing fee. Specifically, the decision unit 106 decides, based on billing information contained in the print data correlated with the ID information accepted by the identification information acceptance unit 105, whether or not there is a need to collect from the user a printing fee for the printing of the print target data contained in the print data correlated with the ID information.

The image forming apparatus 1 further includes an image processing unit 190 configured to perform the edition and processing (coding/decoding, scaling up/down, compression/expansion) of image data read by the image reading unit 110, and the network interface 160 for network communication with the information processing apparatuses 2 via wireless LAN access points.

Figure 3:
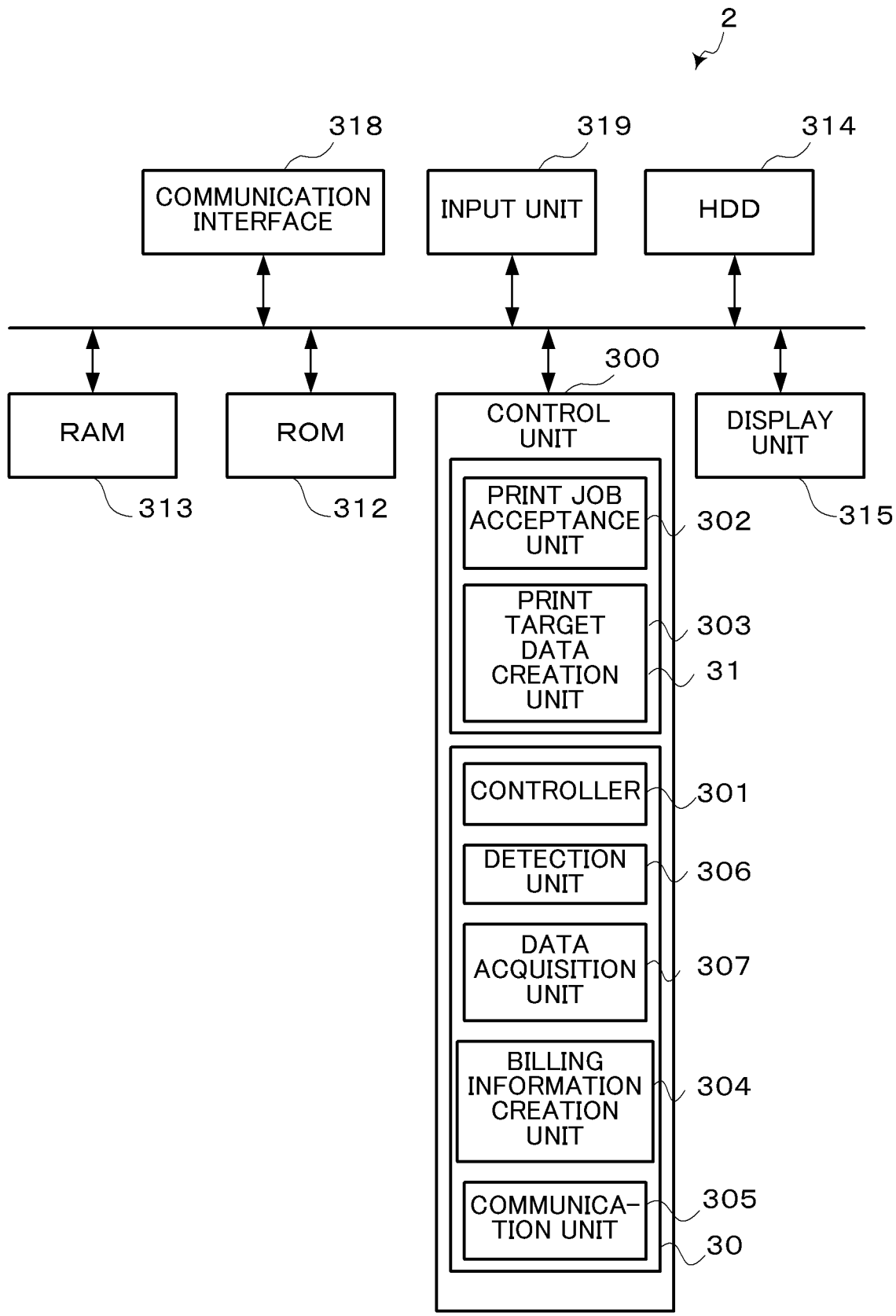
FIG. 3 is a block diagram schematically showing an internal structure of an information processing apparatus.

Next, the structure of the information processing apparatus 2 is described. FIG. 3 is a block diagram schematically showing an internal structure of the information processing apparatus 2.

The information processing apparatus 2 includes a control unit 300, a ROM 312, a RAM 313, an HDD 314, a display unit 315, a communication interface 318, and an input unit 319. These units can transfer data or signals to and from one another via a CPU bus.

The control unit 300 is formed of a CPU or the like. The ROM 312 stores an operating program on basic operations of the information processing apparatus 2. The RAM 313 is used as an operating region of the control unit 300 and for other purposes.

The HDD 314 is a storage medium for storing print target data and programs. The HDD 314 can store, in part of its storage region, various types of print target data composed of text or image data to be printed. Also installed (stored) in the HDD 314, an unshown memory or the like serving as the storage medium are a communication program configured to make the control unit 300 serve as a communication application 30 enabling a network communication with the image forming apparatus 1, and a printer driver configured to make the control unit 300 serve as a printer driver unit 31 compatible with the image forming apparatus 1.

The control unit 300 operates in accordance with the printer driver and thus serves as a print job acceptance unit 302 and a print target data creation unit 303 which constitute the printer driver unit 31. Alternatively, the control unit 300 operates in accordance with the communication program and thus serves as a controller 301, a billing information creation unit 304, a communication unit 305, a detection unit 306, and a data acquisition unit 307 which constitute the communication application 30. The controller 301 is sufficient if it serves as the communication application 30 to the extent necessary in an embodiment to be described later.

For example, the communication program is distributed in recorded form on a storage medium, such as a USB memory, a CD or a DVD, read by a driver of the information processing apparatus 2, and then stored on the HDD 314, the unshown memory or the like. Alternatively, the communication program is downloaded by the information processing apparatus 2 from an unshown server connected to the information processing apparatus 2 on the network and thus stored on the HDD 314, the unshown memory or the like.

In the HDD 314 of the information processing apparatus 2, a printer driver is installed which is compatible with an image forming apparatus (the image forming apparatus 1 in this embodiment) predetermined as an image forming apparatus for use in printing via the information processing apparatus 2.

Each of the controller 301, the print job acceptance unit 302, the print target data creation unit 303, the billing information creation unit 304, the communication unit 305, the detection unit 306, and the data acquisition unit 307 of the control unit 300 may be constituted not by an operation based on a program, such as the above-stated printer driver or communication program, but by a hardware circuit. Furthermore, the control unit 300 is sufficient if it includes the billing information creation unit 304 to the extent necessary in an embodiment to be described later.

The display unit 315 is formed of a liquid crystal display (LCD) or the like and displays, under the display control of the controller 301, contents of various data, and operation guidance and the like for the user operating the information processing apparatus 2.

The communication interface 318 serves as an interface for data communication with the image forming apparatus 1 via a LAN connection.

The input unit 319 is formed of a mouse controller, a keyboard or the like, through which various user's commands are entered.

The control unit 300 includes, as described above, the controller 301, the print job acceptance unit 302, the print target data creation unit 303, the billing information creation unit 304, the communication unit 305, the detection unit 306, and the data acquisition unit 307.

The controller (display controller) 301 governs the overall operation control of the information processing apparatus 2, including the display control of the display unit 315. The controller 301 controls the operation of the information processing apparatus 2 for the purpose of processing necessary to print out on the image forming apparatus 1 print target data stored on the information processing apparatus 2.

The print job acceptance unit 302 of the printer driver unit 31 accepts an entry of a print job from a user through the input unit 319. For example, a print job entered by a user into the input unit 319 contains the specification of print target data selected among image data and text data stored on the HDD 314, data created using applications executable on the information processing apparatus 2, image data currently displayed on an Internet website being browsed on the information processing apparatus 2, etc., an execution command of the print job, and so on. Also entered into the print job acceptance unit 302 is accompanying print information concerning the print job, including, for example, the document name, whether to print in color or black-and-white, the page size, the number of pages, and the number of copies. However, this is not intended to limit the type of user job accepted by the input unit 319 to the above types.

The print target data creation unit 303 of the printer driver unit 31 converts the print target data indicated by the print job accepted by the print job acceptance unit 302, i.e., the print target data specified as a print target on the image forming apparatus 1 by the user, into a printer language (PCL in this embodiment) having a format (print format) suitable for printing on the image forming apparatus 1.

The detection unit 306 detects whether or not the print target data has been created in the format suitable for printing on the image forming apparatus 1 as the predetermined image forming apparatus by the print target data creation unit 303 of the printer driver unit 31. Since, as described previously, the printer driver compatible with the predetermined image forming apparatus 1 as an image forming apparatus for use in printing via the information processing apparatus 2 is installed into the HDD 314, the detection unit 306 detects, upon creation of print target data in the print target data creation unit 303, the print target data as print target data created in the format suitable for printing on the image forming apparatus 1 which is the predetermined image forming apparatus.

The data acquisition unit 307 acquires, when the detection unit 306 detects that the print target data has been created, the print target data from the print target data creation unit 303.

The communication unit 305 transmits print data containing the print target data acquired by the data acquisition unit 307 and the accompanying print information extracted from the print job to the image forming apparatus 1 using a predetermined protocol (HTTPS in this embodiment) applicable to the image forming apparatus 1. The accompanying print information transmitted by the communication unit 305 contains device information indicating the information processing apparatus 2. The communication unit 305 transfers various data necessary for printing of the print target data to and from the image forming apparatus 1.

The billing information creation unit 304 creates, based on the accompanying print information contained in the print job, billing information indicating a printing fee charged to the user who has ordered the printing of the print target data. The billing information creation unit 304 creates, as the billing information, either one of fee-charged information indicating that a printing fee should be collected from the user through the coin vendor 6 and no-charge information indicating that the printing fee has been already paid by the user or no printing fee is needed. The billing information creation unit 304 calculates a printing fee based on, for example, print in color or black-and-white, the page size, the number of pages, and the number of copies contained in the accompanying print information and using various fee information, such as a predetermined color printing fee (yen/sheet), a predetermined black-and-white printing fee (yen/sheet), and an additional fee (yen) varying with the page size. Then, when creating fee-charged information as billing information, the billing information creation unit 304 adds the calculated printing fee information to the billing information.

Figure 4:
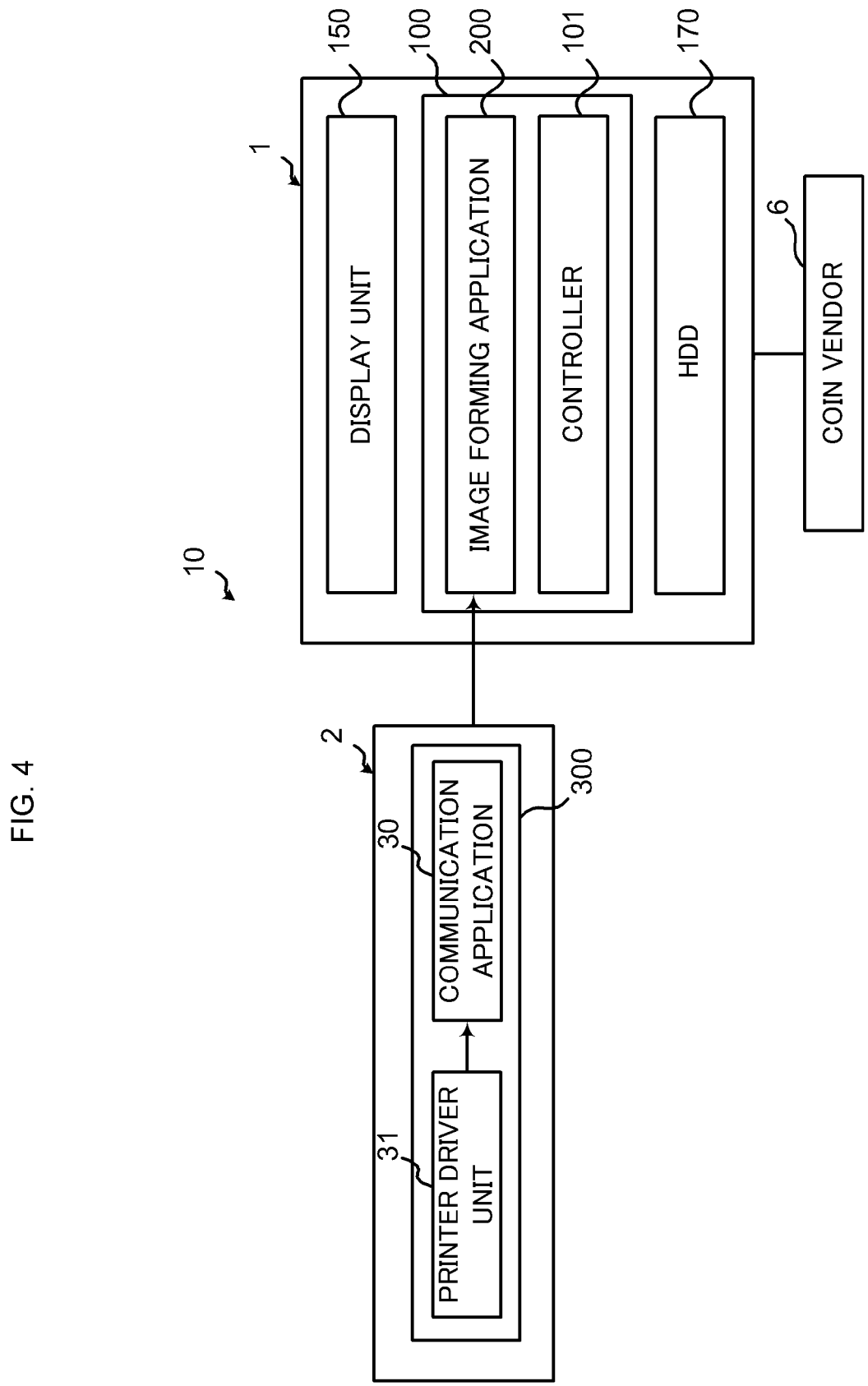
FIG. 4 is a diagram conceptually showing functions for printing using the image forming apparatus and the information processing apparatus.

Next, a description is given of a process in printing the print target data transmitted from the information processing apparatus 2 on the image forming apparatus 1, from a functional viewpoint. FIG. 4 is a diagram conceptually showing functions for printing using the image forming apparatus 1 and the information processing apparatus 2.

In the information processing apparatus 2, the printer driver unit 31 is initiated by a user's operation of the input unit 319. The printer driver unit 31 converts print target data specified by a user's command into a printer language having a format compatible with the image forming apparatus 1. The communication application 30 acquires the print target data converted into a printer language compatible with the image forming apparatus 1 by the printer driver unit 31, and transmits print data containing the print target data and accompanying print information concerning the print target data to the image forming apparatus 1 using the predetermined protocol.

In the image forming apparatus 1, the image forming application 200 waits for the print data complying with the predetermined protocol, while ready for receiving it. The image forming apparatus 1 can allow the image forming unit 130 to print the print target data by a separate operation of the control unit 100 independent of the image forming application 200, in which case the protocol employed in the print control of the control unit 100 is different from the predetermined protocol above. In other words, when print data transmitted from the information processing apparatus 2 complies with the predetermined protocol, the image forming application 200 receives the print data. Thus, in the image forming apparatus 1, when print data complying with the predetermined protocol is transmitted from the information processing apparatus 2, the image forming application 200 acquires the print data. The image forming application 200 causes the HDD 170 to store the received print data.

Furthermore, the image forming application 200 transmits the foregoing ID information and the like to the communication application 30 of the information processing apparatus 2.

The control unit 100 also serves as a browser and the browser collaborates with the image forming application 200 to allow the display unit 150 to display user guidance which is necessary to print the print target data contained in the print data acquired by the image forming application 200.

The image forming application 200 reads, subject to the user's entry of the ID information, the print target data of the print data correlated with the ID information from the HDD 170 and causes the image forming unit 130 to print the print target data.

The image forming application 200 also collaborates with the coin vendor 6 to transmit a command to collect a printing fee to the coin vendor 6 and receive a notice of completion of collection of the printing fee from the coin vendor 6. The collaboration of the image forming application 200 with the coin vendor 6 forms a component of the image forming apparatus 1 to the extent necessary in an embodiment to be described later.

Figure 5:
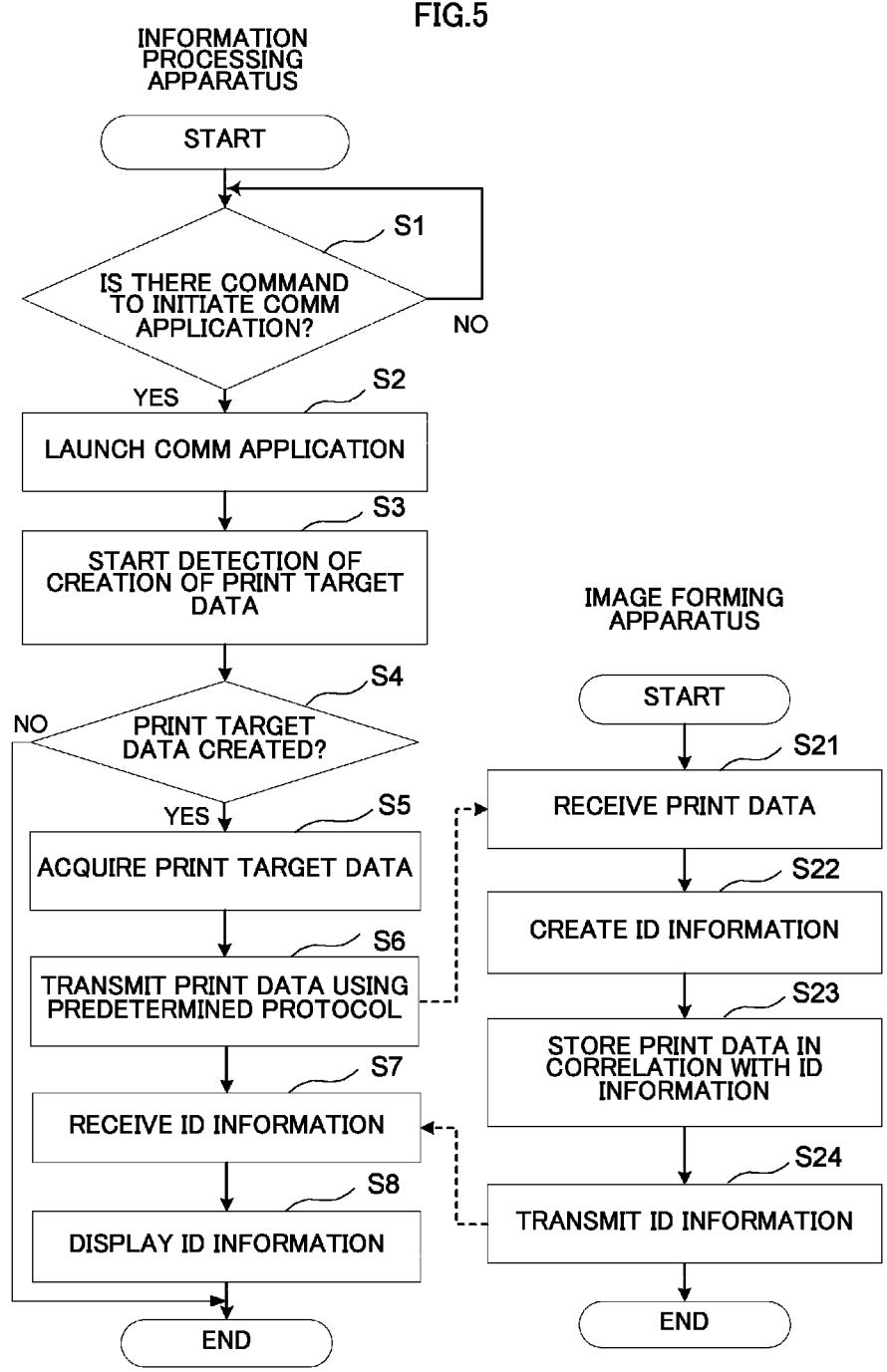
FIG. 5 is a flowchart showing a first embodiment of a printing process using the image forming system.
Figure 6:
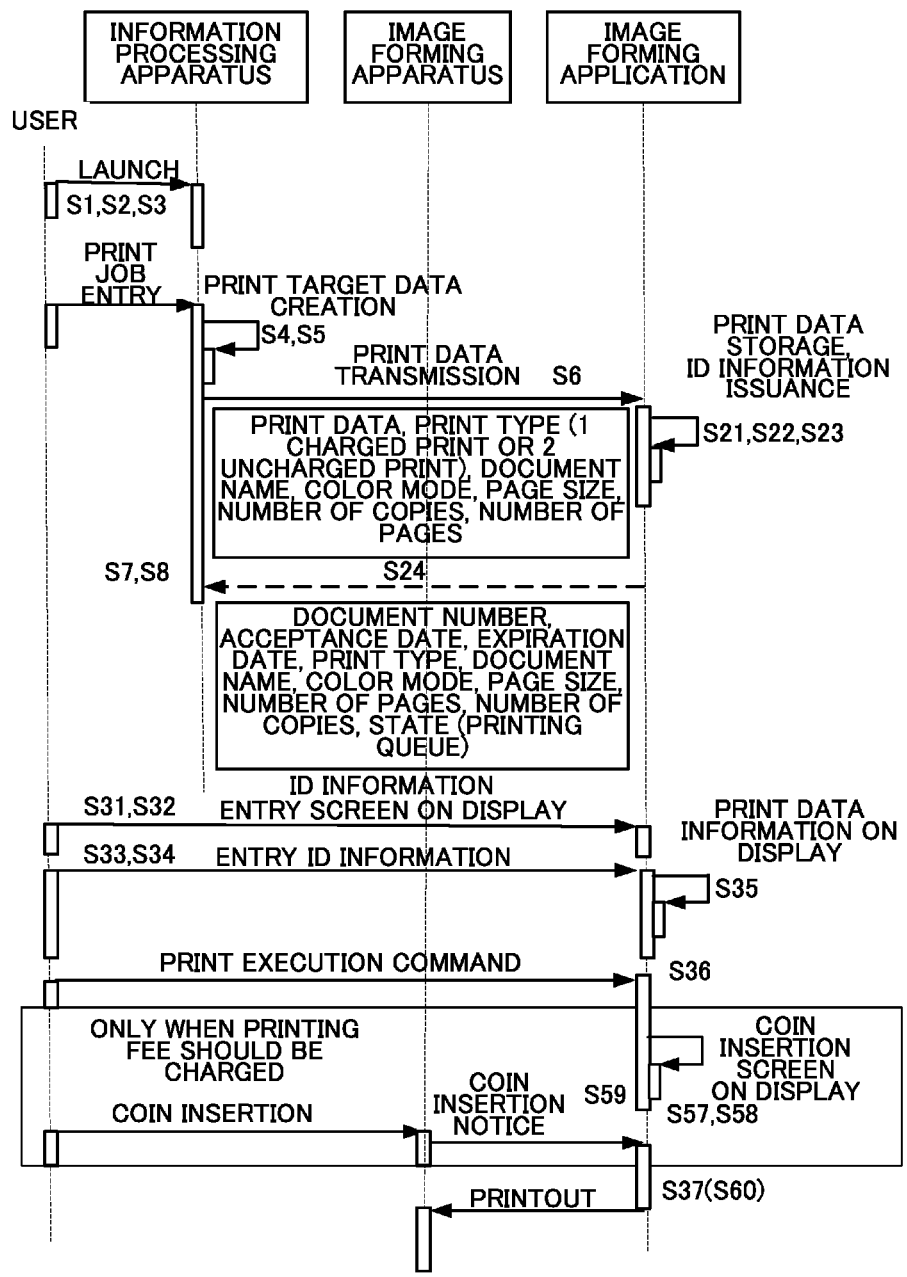
FIG. 6 is a diagram schematically showing data communications between the information processing apparatus and the image forming apparatus.

Next, a description is given of a first embodiment of a printing process using the image forming system 10. FIG. 5 is a flowchart showing the first embodiment of the printing process using the image forming system 10. FIG. 6 is a diagram schematically showing data communications between the information processing apparatus 2 and the image forming apparatus 1.

When a command to initiate the communication application 30 is entered by a user's operation of the input unit 319 and the control unit 300 accepts the command (YES in S1), the control unit 300 launches the communication application 30 (S2). Thus, the control unit 300 serves as the detection unit 306, the data acquisition unit 307, and the communication unit 305 which constitute the communication application 30. Then, the detection unit 306 starts the detection of whether or not the print target data creation unit 303 of the printer driver unit 31 has created print target data in a printer language having a format compatible with the image forming apparatus 1 (S3).

Thereafter, the print job acceptance unit 302 waits for an entry of a print job specifying print target data based on the user's operation of the input unit 319. When the print job acceptance unit 302 accepts the entry of the user's print job specifying print target data, the print target data creation unit 303 creates print target data in the printer language compatible with the image forming apparatus 1.

When the detection unit 306 detects that the print target data creation unit 303 has created the print target data (YES in S4), the data acquisition unit 307 acquires the print target data created by the print target data creation unit 303 (S5). On the other hand, when the detection unit 306 does not detect the creation of the print target data (NO in S4), the process ends.

The communication unit 305 acquires, from the accepted print job, various information elements which will constitute accompanying print information concerning the print target data acquired by the data acquisition unit 307, such as the number of copies and whether to print in color or black-and-white, adds a device information element indicating the information processing apparatus 2 to the acquired information elements to form accompanying print information, and transmits print data containing the accompanying print information and the acquired print target data, using the predetermined protocol (HTTPS in this embodiment), to the image forming apparatus 1 via the communication interface 318 and the LAN (S6).

In the image forming apparatus 1, when in the above manner the print data is transmitted in compliance with the above protocol from the communication unit 305 of the information processing apparatus 2 to the image forming apparatus 1, the print data receiving unit 102 constituting part of the image forming application 200 receives the print data complying with the protocol via the LAN and the network interface 160 (S21). Upon reception of the print data, the identification information creation unit 103 creates ID information concerning the print data (S22). The controller 101 correlates the print data with the ID information and causes the HDD 170 to store the correlated print data (S23). Then, the identification information transmitting unit 104 transmits the ID information via the network interface 160 and the wired LAN to the information processing apparatus 2 having transmitted the print data (S24). In this embodiment, the identification information transmitting unit 104 transmits to the information processing apparatus 2 not only the ID information but also the acceptance date and expiration date of the print data, the state (printing queue), and the above accompanying print information.

In the information processing apparatus 2, when in the above manner the ID information concerning the print data having previously transmitted to the image forming apparatus 1 is transmitted from the image forming apparatus 1 to the information processing apparatus 2, the communication unit 305 receives the ID information (S7). Then, the controller 301 causes the display unit 315 to display the received ID information (S8). In this embodiment, since the communication unit 305 additionally receives the acceptance date and expiration date of the print data, the state (printing queue), and the above accompanying print information, the controller 301 causes the display unit 315 to display not only the ID information but also the received various information elements. This showing of the ID information enables the user of the information processing apparatus 2 to see the ID information concerning the print target data set by the user to be printed out on the image forming apparatus 1.

Figure 7:
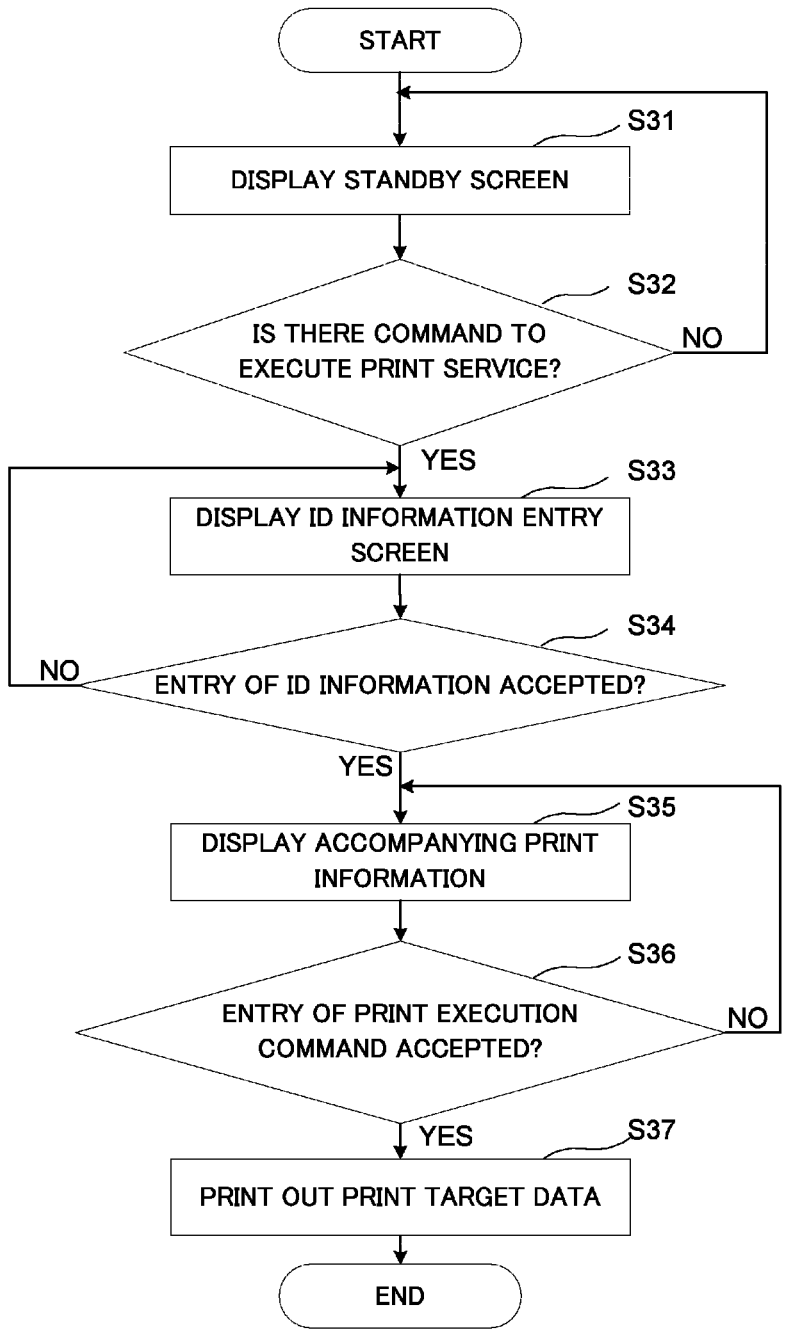
FIG. 7 is a flowchart showing a process of the image forming apparatus after receiving print data and transmitting identification information.
Figure 8:
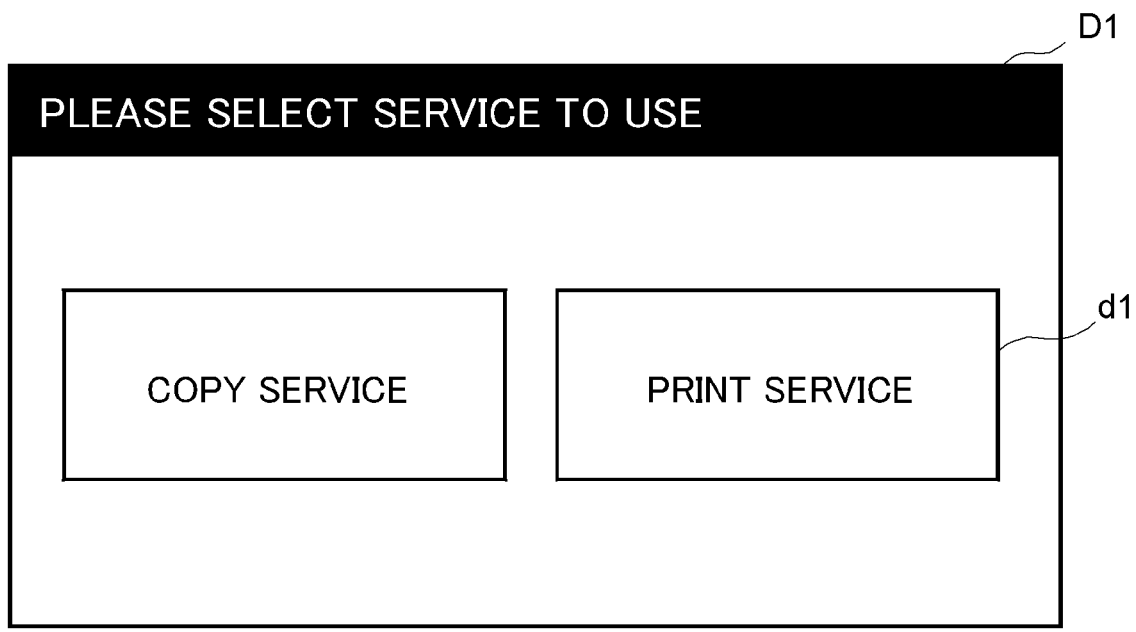
FIG. 8 is a diagram showing an example of a screen displayed on a display unit.
Figure 9:
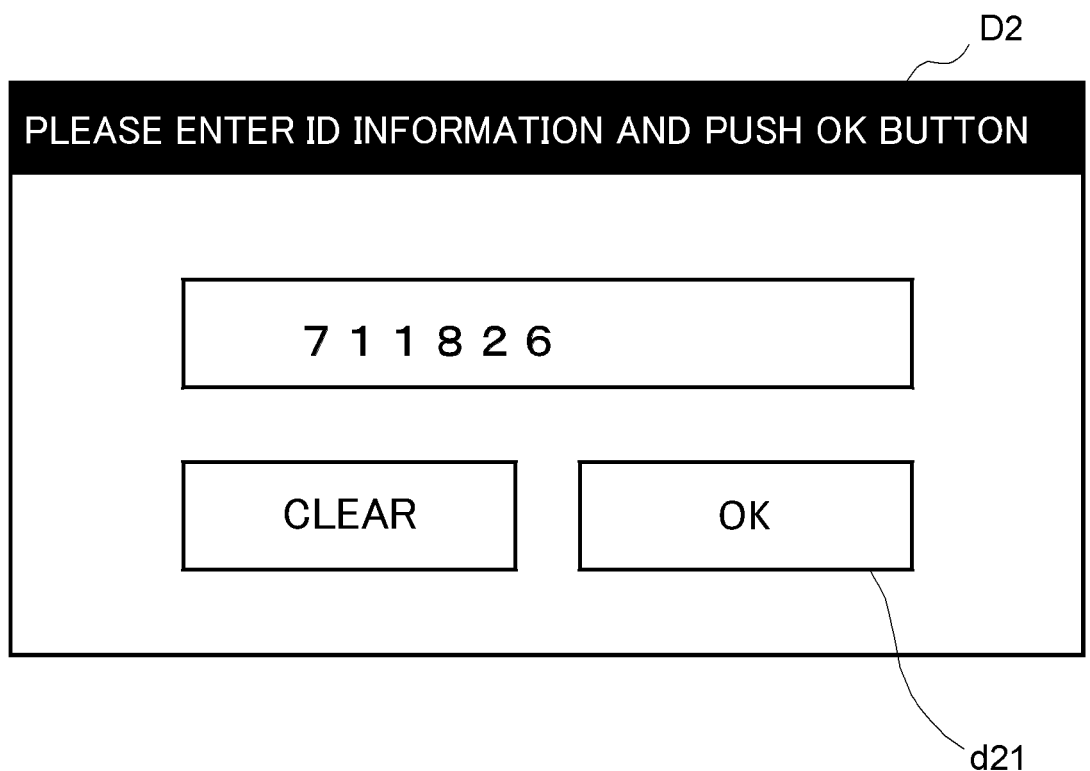
FIG. 9 is a diagram showing another example of a screen displayed on the display unit.

Next, a description is given of a process of the image forming apparatus 1 after receiving the print data and transmitting the ID information. FIG. 7 is a flowchart showing a process of the image forming apparatus 1 after receiving the print data and transmitting the ID information. FIGS. 8 to 10 are diagrams showing examples of a screen displayed on the display unit 150. The description is given also with reference to FIG. 6.

In the image forming apparatus 1, after the identification information transmitting unit 104 transmits the ID information concerning the received print data to the information processing apparatus 2, the image forming apparatus 1 waits for entering a command to execute print by the user. In this wait state, the controller 101 causes the display unit 150 to display a standby screen D1 shown in FIG. 8 (S31).

When in this state, for example, the user operates a part d1 indicated as "PRINT SERVICE" on an initial guide screen D1 by touch to enter a command to execute a print service, which is a process for printing the print target data received from the information processing apparatus 2, via a touch panel mechanism provided as the operation unit 20 in the display unit 150 (YES in S32), the controller 101 causes the display unit 150 to display an identification information entry screen D2 (FIG. 9) which shows a message prompting the user to enter the ID information (S33). The control unit 101 causes the display unit 150 to continue to display the standby screen D1 until the command to execute a print service is entered (NO in S32, S31).

When the ID information concerning the print data previously transmitted from the information processing apparatus 2 to the image forming apparatus 1 based on the user's command is entered, for example, by a user's operation of the operation unit 20 and a user's touch panel operation of an "OK" button d21 on the identification information entry screen D2 and the entered ID information is accepted by the identification information acceptance unit 105 (YES in S34), the controller 101 reads from the HDD 170 the accompanying print information contained in the print data correlated with the accepted ID information, the acceptance date and expiration date of the print data, and the state (printing queue) and causes the display unit 150 to display these information elements as a document confirmation screen D3 as shown in FIG. 10 (S35). The controller 101 causes the display unit 150 to continue to display the identification information entry screen D2 until the entry of the ID information is accepted by the identification information acceptance unit 105 (NO in S34, S33).

When, with the document confirmation screen D3 displayed on the display unit 150, a print execution command for the print target data shown by the display is entered, for example, by a user's touch panel operation of a "PRINT" button d31 on the document confirmation screen D3 or a user's operation of the operation unit 20 and the print execution command is accepted by the controller 101 (YES in S36), the controller 101 reads from the HDD 170 the print target data (print target data contained in the print data correlated with the ID information accepted in S34), causes the image forming unit 130 to form an image of (print out) the print data in conformity with the contents shown by the accompanying print information concerning the print target data (S37), and ends the process. The control unit 101 causes the display unit 150 to continue to display the document confirmation screen D3 until it accepts the entry of the print execution command (NO in S36, S35).

If, in such a printing process using the image forming system 10, the image forming apparatus 1 or the information processing apparatus 2, for example, a manager desires to manage user's printing using the information processing apparatus 2 and the image forming apparatus 1, he or she can previously install the above communication program into the information processing apparatus 2. Thus, when a user executes the creation of print target data in a format suitable for printing on the image forming apparatus 1 predetermined as an image forming apparatus for printing via the information processing apparatus 2, the detection unit 306 detects the creation of print target data so that the data acquisition unit 307 acquires the print target data. Therefore, after the acquisition of the print target data, the manager can arbitrarily manage user's printing of the print target data on the image forming apparatus 1 via the information processing apparatus 2, such as whether or not to allow the printing and whether or not to be charged to the user.

Furthermore, since the communication unit 305 transmits to the image forming apparatus 1 print data containing the above print target data and accompanying print information in compliance with the predetermined protocol applicable to the image forming apparatus 1, the image forming apparatus 1 can handle the print data transmitted in compliance with the predetermined protocol differently from print target data complying with other protocols. Moreover, printing based on the print data transmitted from the information processing apparatus 2 can be done, without provision of any server on the network, on the image forming apparatus 1 under the above management.

Thus, for example, in a public facility in which an information processing apparatus 2 and an image forming apparatus 1 are installed to allow multiple users to share them, user's printing of print target data using the information processing apparatus 2 and the image forming apparatus 1 can be managed more easily.

In the image forming apparatus 1, ID information created by the identification information creation unit 103 is transmitted from the identification information transmitting unit 104 to the information processing apparatus 2. When the ID information is received by the communication unit 305 of the information processing apparatus 2, the controller 301 causes the display unit 315 to display the ID information to allow the user to recognize the ID information. When the ID information is entered into the image forming apparatus 1 by the user and accepted by the identification information acceptance unit 105 of the image forming apparatus 1, the controller 101 causes the image forming unit 130 to print the print target data contained in the print data. Therefore, the print target data can be handled as specified by the ID information between the user and the image forming apparatus 1. The use of ID information in the above manner enables, for example, the control of printing print target data transmitted from the information processing apparatus 2 on the image forming apparatus 1 not immediately after the print target data is received by the image forming apparatus 1 but after the printing fee is paid or after the user enters a print execution command.

The techniques disclosed in BACKGROUND have the following problems: In the case (1), the manager can manage whether to allow or reject user's printing on the image forming apparatus but has difficulty in more detailed management than the print allowance/rejection management. In the case (2), since a personnel collects the printing fee from the user, he or she may forget to collect the fee and a personnel cost is necessary. In the case (3), a print service server is necessary and users are required for troublesome preparations for printing, such as prior registration on the server. In the above embodiment according to the one aspect of the present disclosure, these problems can be solved as described above.

Figure 11:
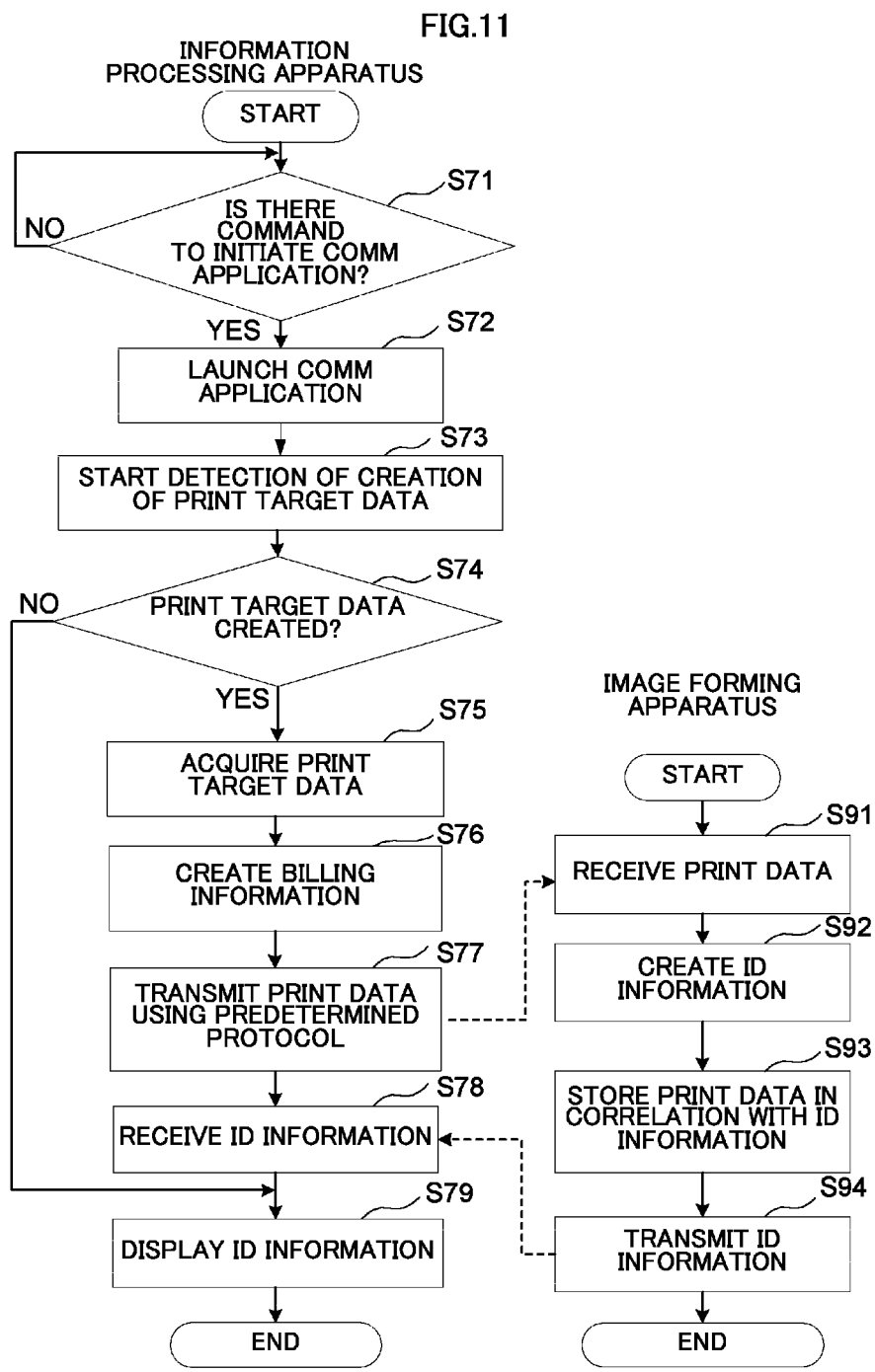
FIG. 11 is a flowchart showing a second embodiment of a printing process using the image forming system.
Figure 12:
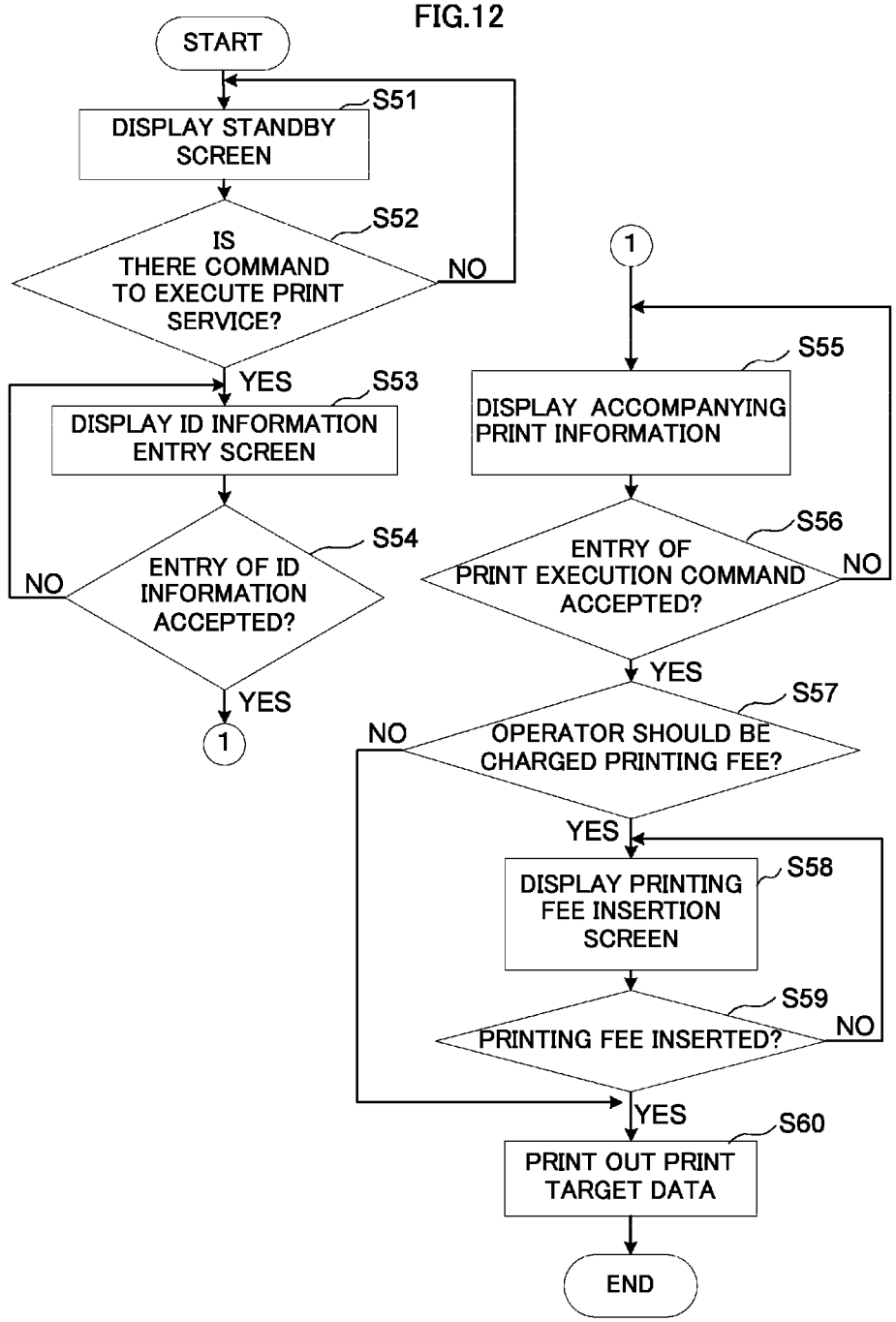
FIG. 12 is a flowchart showing a second embodiment of a process of the image forming apparatus after receiving print data from the information processing apparatus.
Figure 13:
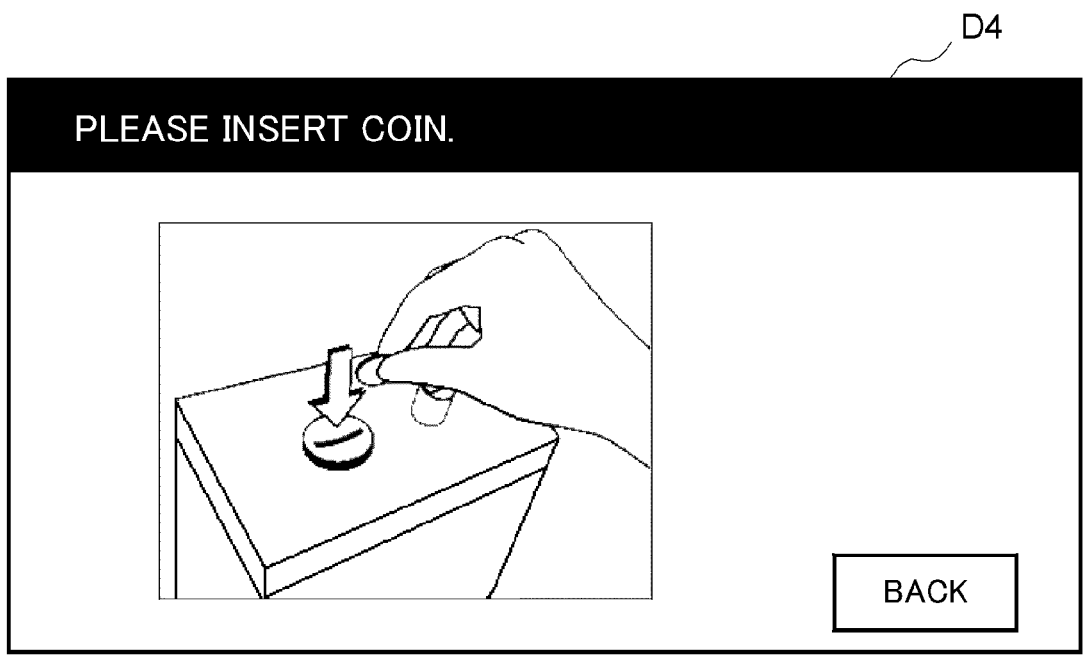
FIG. 13 is a diagram showing still another example of a screen displayed on the display unit.

Next, a description is given of a second embodiment of the printing process using the image forming system 10 and a second embodiment of the process of the image forming apparatus 1 after receiving the print data from the information processing apparatus 2 and transmitting the ID information. FIG. 11 is a flowchart showing a second embodiment of the printing process using the image forming system 10. FIG. 12 is a flowchart showing a second embodiment of the image forming apparatus 1 after receiving the print data from the information processing apparatus 2. FIG. 13 is a diagram showing an example of a screen displayed on the display unit 150. These second embodiments are described with reference to not only FIGS. 11 to 13 but also FIG. 3, FIG. 5, and FIG. 8. Note that the description of the same process as in the first embodiment is not given.

In this second embodiment, the control unit 300 of the information processing apparatus 2 includes the billing information creation unit 304. When in the information processing apparatus 2 the data acquisition unit 307 acquires print target data converted into a printer language compatible with the image forming apparatus 1 by the print target data creation unit 303 (S75), the billing information creation unit 304 creates billing information containing fee-charged information or no-charge information (S76). For example, when, after already paying a printing fee for the print target data to a provider or the like of the image forming system 10, the image forming apparatus 1 or the information processing apparatus 2, a user enters into the input unit 319 of the information processing apparatus 2 fee-paid information formed of a number, a sign or the like given from the provider provided that the payment is completed, the billing information creation unit 304 creates billing information containing no-charge information. On the other hand, when the user has not entered fee-paid information, the billing information creation unit 304 creates billing information containing fee-charged information.

In creating fee-charged information as the billing information, the billing information creation unit 304 acquires, from the print job, accompanying print information concerning the print target data currently specified as the print target by the user (page size, number of pages, etc.), creates printing fee information indicating a printing fee calculated based on the accompanying print information, and adds the printing fee information to the billing information.

In the information processing apparatus 2, when transmitting print data to the image forming apparatus 1 (S77), the communication unit 305 transmits print data containing the print target data, the accompanying print information, and the billing information to the image forming apparatus 1 using the above predetermined protocol.

When in the image forming apparatus 1 the print data receiving unit 102 receives the print data (S91), the image forming apparatus 1 executes the process of S92 to S94 like the first embodiment and transmits ID information created for the print data to the information processing apparatus 2 having transmitted the print data. In the image forming apparatus 1, the controller 101 causes the display unit 150 to display the standby screen D1 (FIG. 8) (S79) and waits for the user to enter the ID information.

Thereafter, the image forming apparatus 1 accepts a command to execute a print service and the ID information concerning the print data desired by the user (YES in S52 and YES in S54 both shown in FIG. 12). Then, when the controller 101 accepts a print execution command (YES in S56), the decision unit 106 decides, based on the billing information contained in the print data correlated with the accepted ID information, whether or not the user should be charged a printing fee (S57).

If in this case the decision unit 106 detects the fee-charged information from the billing information and decides that the user should be charged a printing fee (YES in S57), the controller 101 causes the display unit 150 to display a message prompting the user to put the printing fee into the coin vendor 6 (S58), for example, by displaying a printing fee insertion screen D4 shown in FIG. 13.

When, after the display, the user inserts coins or a note as the printing fee into the coin vendor 6 and the coin vendor 6 detects the insertion of coins or note equivalent to the printing fee (i.e., the completion of payment of the printing fee) (YES in S59), the coin vendor 6 notifies the controller 101 of the detection of the completion of payment. Thus, the controller 101 reads from the HDD 170 the print target data contained in the print data correlated with the ID information accepted in S54 and causes the image forming unit 130 to form an image of (print out) the print target data (S60). The controller 101 causes the display unit 150 to continue to display the printing fee insertion screen D4 until it receives the notice of the detection of completion of payment of the printing fee from the coin vendor 6 (NO in S59, S58).

On the other hand, if the decision unit 106 detects the no-charge information from the billing information and decides that the user should not be charged for the printing (NO in S57), the controller 101 reads from the HDD 170 the print target data contained in the print data correlated with the ID information accepted in S54 and causes the image forming unit 130 to form an image of (print out) the print target data without need for the coin vendor 6 to detect the completion of the payment of the printing fee (S60).

In the second embodiment, the provider of the image forming system 10, the image forming apparatus 1 or the information processing apparatus 2 can selectively control, depending upon the contents of the charging to the user, whether to allow the printing subject to the collection the printing fee from the user or allow the printing without need to collect the printing fee from the user. Therefore, a printing service depending upon the state of charge to the user can be provided to the user.

Embodiments according to aspects of the present disclosure are not limited to the configurations described above and can be modified in various ways. The configurations and processes shown in the above embodiments with reference to FIGS. 1 to 13 are merely illustrative and can be appropriately modified.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An information processing apparatus in which a CPU is operable to function, according to a program stored in a non-transitory computer-readable medium, as:
    a detection unit configured to detect whether or not print target data based on a print job entered by a user has been created in a format suitable for printing on a predetermined image forming apparatus;
    a data acquisition unit configured to do, when the detection unit detects that the print target data has been created in the format suitable for printing, data acquisition processing for acquiring the created print target data and accompanying print information extracted from the print job but avoid doing the data acquisition processing when the detection unit does not detect that any print target data has been created in the format suitable for printing; and
    a communication unit configured to transmit print data containing the print target data and the accompanying print information both acquired by the data acquisition unit to the predetermined image forming apparatus using a predetermined protocol applicable to the predetermined image forming apparatus and different from a protocol applied for normal print control in the predetermined image forming apparatus.

2. The information processing apparatus according to claim 1, wherein
    the detection unit is configured to detect whether or not print target data based on a print job entered by a user has been created and in the format suitable for printing on the predetermined image forming apparatus by a printer driver unit, and
    the data acquisition unit is configured to acquire from the printer driver unit, when the detection unit detects that the print target data has been created, the created print target data and accompanying print information extracted from the print job.

3. The information processing apparatus according to claim 1, further including a billing information creation unit configured to create, based on the accompanying print information contained in the print job, billing information indicating a printing fee charged to the user who has entered the print job, wherein communication unit is configured to transmit the print data containing not only the print target data and the accompanying print information, but also the billing information to the predetermined image forming apparatus using the predetermined protocol.

4. An image forming system including the information processing apparatus according to claim 1 and the predetermined image forming apparatus capable of communication with the information processing apparatus, wherein the communication unit of the information processing apparatus is configured to transmit print data containing the print target data and the accompanying print information both acquired by the data acquisition unit to the predetermined image forming apparatus using the predetermined protocol applicable to the predetermined image forming apparatus and receive identification information for specifying the print data from the predetermined image forming apparatus which is the destination of the print data, the information processing apparatus further includes a display controller that causes a display unit of the information processing apparatus to display the identification information received by the communication unit, and the predetermined image forming apparatus includes:

a print data receiving unit configured to receive the print data containing the print target data and the accompanying print information from the information processing apparatus using the protocol compatible with the predetermined image forming apparatus;

an identification information creation unit configured to create, when the print data receiving unit receives the print data, identification information for specifying the print data;

an identification information transmitting unit configured to transmit the identification information created by the identification information creation unit to the information processing apparatus having transmitted the print data;

a print data storage unit configured to store the print data received by the print data receiving unit in correlation with the created identification information;

a printing unit configured to print the print target data contained in the print data;

an identification information acceptance unit configured to accept an entry of the identification information; and a controller configured to read from the print data storage unit the print data correlated with the identification information the entry of which has been accepted by the identification information acceptance unit and cause the printing unit to print the print target data contained in the print data using part of the accompanying print information.

5. A computer-readable non-transitory storage medium with a communication program stored thereon, wherein the communication program makes an information processing apparatus serve as:

a detection unit configured to detect whether or not print target data based on a print job entered by a user has been created in a format suitable for printing on a predetermined image forming apparatus;

a data acquisition unit configured to do, when the detection unit detects that the print target data has been created in the format suitable for printing, data acquisition processing for acquiring the created print target data and accompanying print information extracted from the print job but avoid doing the data acquisition processing when the detection unit does not detect that any print target data has been created in the format suitable for printing; and a communication unit configured to transmit print data containing the print target data and the accompanying print information both acquired by the data acquisition unit to the predetermined image forming apparatus using a predetermined protocol applicable to the predetermined image forming apparatus and different from a protocol applied for normal print control in the predetermined image forming apparatus.

6. An information processing apparatus in which a control unit includes, as hardware circuits, a detection unit configured to detect whether or not print target data based on a print job entered by a user has been created in a format suitable for printing on a predetermined image forming apparatus, a data acquisition unit configured to do, when the detection unit detects that the print target data has been created in the format suitable for printing, data acquisition processing for acquiring the created print target data and accompanying print information extracted from the print job but avoid doing the data acquisition processing when the detection unit does not detect that any print target data has been created in the format suitable for printing, and a communication unit configured to transmit print data containing the print target data and the accompanying print information both acquired by the data acquisition unit to the predetermined image forming apparatus using a predetermined protocol applicable to the predetermined image forming apparatus and different from a protocol applied for normal print control in the predetermined image forming apparatus.

* * * * *